March 18, 1947.     A. H. LONGSTREET     2,417,802
DEVICE TO FACILITATE MOUNTING SPECIMENS ON MICROSCOPE SLIDES
Filed Feb. 5, 1944
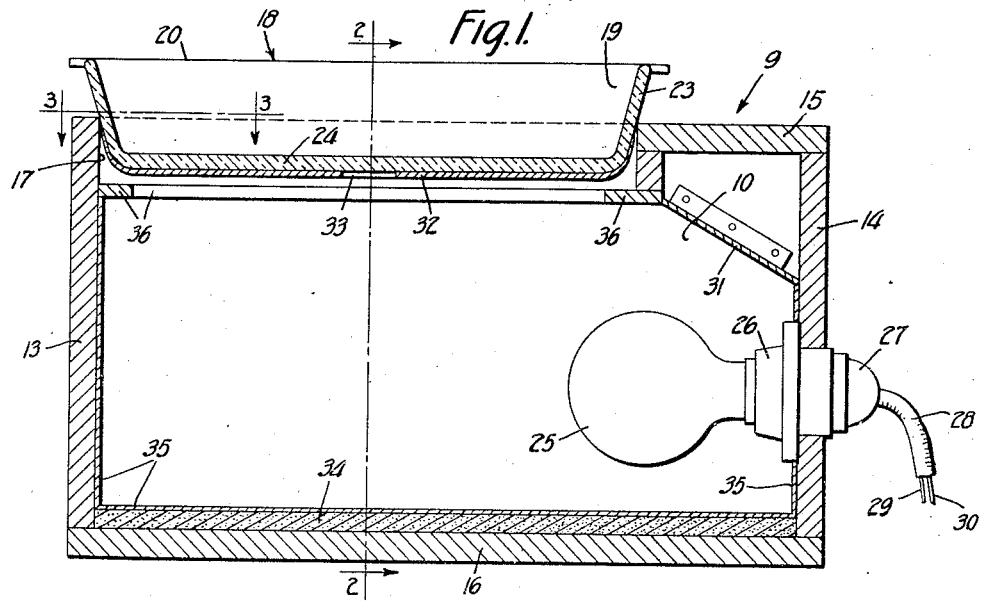
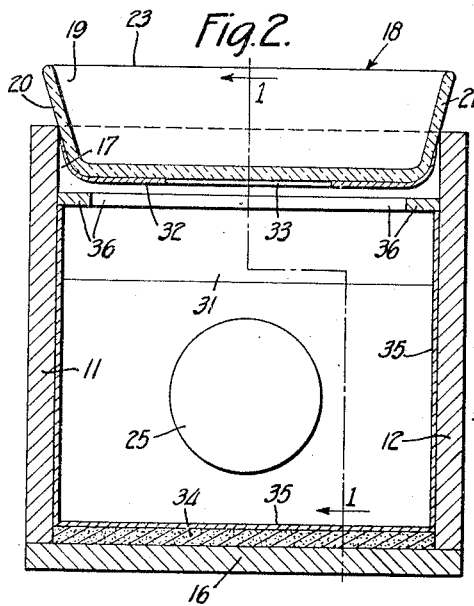
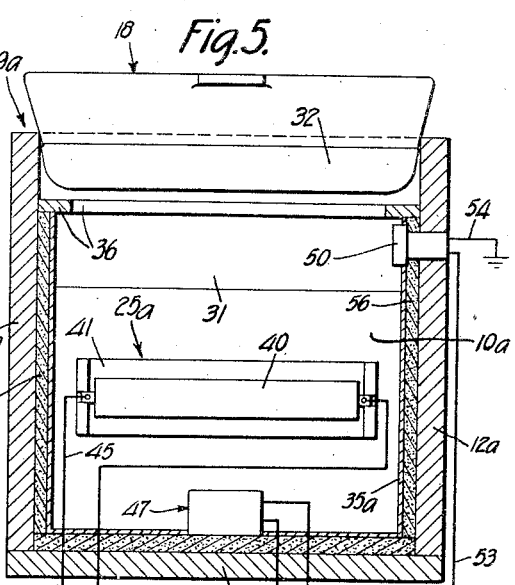
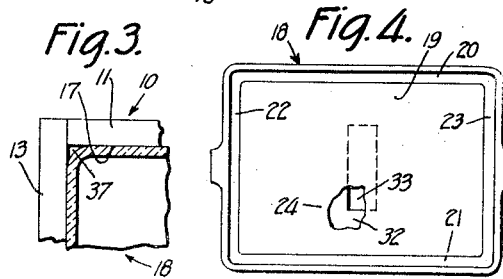
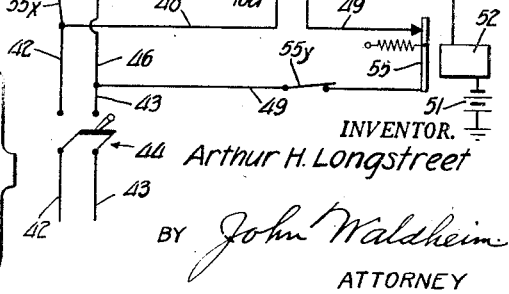
INVENTOR.
Arthur H. Longstreet
BY John Waldheim
ATTORNEY Patented Mar. 18, 1947

2,417,802

UNITED STATES PATENT OFFICE 2,417,802

DEVICE TO FACILITATE MOUNTING SPECIMENS ON MICROSCOPE SLIDES

Arthur H. Longstreet, Brooklyn, N. Y.; Mirian Annette Longstreet, executrix of said Arthur H. Longstreet, deceased Application February 5, 1944, Serial No. 521,280

1 Claim. (Cl. 88—40)

This invention relates to improvements in mounting specimens such, for example, as pathological tissue sections on microscope slides.

The invention relates more particularly to a device to facilitate mounting of specimens on microscope slides.

Heretofore in preparing tissue sections for mounting, it has been the practice to warm a suitable solution, contained in an enamel tray into which were placed the tissue sections so as to condition them for convenient mounting on the slide.

Technicians while preparing such slides are frequently interrupted to perform other duties. In the meantime the solution cools and thus renders the tissue unsuitable for mounting. It then becomes necessary after each interruption to replace the cooled solutions by fresh warm solution to again render the tissue sections suitable for mounting. This replacing of the solution after each interruption has been found highly objectionable.

The manner of rendering the tissue sections visible, while mounting them, has been by surface illumination, or in other words, illumination from above, and has been found most unsatisfactory.

An object of the present invention is to overcome the above-mentioned objections and facilitate mounting of specimens on microscope slides.

To this end provision is made to maintain the solution warm for an indefinite period so that when the technician returns, after an interruption, he finds the solution at the proper temperature and may proceed directly with the work of mounting the specimens without any inconvenience and loss of time.

To increase visibility of the tissue sections to a maximum while mounting them, a translucent tray is used. Provision is made to direct the light through the bottom of the tray from beneath and through the slide and specimens towards the observer, the slide and specimens being located upon the bottom of the tray.

In carrying out the invention there is provided a box-like case in which is located light and heat source means. In the top of the case sets the tray which contains the solution and in which the mounting of the specimens is accomplished. Thus the bottom of the tray is exposed to the heat of the source means to warm the solution and the light of the source means passes through the bottom of the tray to render the slide and specimens visible.

The area of the bottom of the tray is large as compared with the size of the slide and the specimens to be mounted. This large area is desirable to effectively heat the solution. It is not desirable, however, to let the light shine through the entire area of the bottom. Provision is therefore made to permit the light to shine through only a small area of the tray bottom approximately the same size as the slide.

Other features and advantages will hereinafter appear.

In the drawings which form part of the specification,

Figure 1 is a longitudinal, vertical section of the device taken on the line 1—1 of Figure 2 and looking in the direction of the arrows at said line;

Figure 2 is a transverse, vertical section taken on the line 2—2 of Figure 1, and looking in the direction of the arrows;

Figure 3 is a top plan view, in section, of one corner of the device, the section being taken on the line 3—3 of Figure 1 and looking in the direction of the arrows;

Figure 4 is a top plan view of the tray; and

Figure 5 is a vertical transverse section, similar to Figure 2, illustrating another form of the invention.

The form of the invention illustrated in Figures 1 to 4 comprises a box-like case 9 which provides a combined heating and illuminating chamber 10. The case 9 is composed of side walls 11 and 12, end walls 13 and 14, a partial top wall 15 and a bottom member 16. The upper edges of the walls 11, 12 and 13 form with one edge of wall 15 an opening 17, in the upper part of the housing 10, which may be closed by a detachable cover 18.

The cover 18 shown in the present invention has a depression 19 therein formed by inclined walls 20, 21, 22 and 23 extending upwardly and outwardly from a bottom section 24. In other words the cover 18 forms a tray adapted to receive a suitable solution into which may be placed specimens such as for example tissue sections, to condition them for convenient mounting on microscope slides. The shape of the tray as seen from above is herein shown as rectangular. It will be understood, however, that is may be of any other polygonal shape, or it may be circular or elliptical.

The tissue sections or specimens have a tendency to curl but when placed in a suitable solution or liquid which is heated sufficiently to warm it the specimens are rendered suitable for mounting. To heat the liquid there is provided in the chamber 10 light and heat source means in the form of a lamp 25 herein shown as an electric bulb held in one end of a socket 26 secured to the wall 14. The other end of the socket extends through the wall 14 to the exterior of the case 9 and receives a detachable plug 27 connected to an electric cord 28 having conductors 29 and 30 through which is supplied electric current to the bulb 25. The lamp 25 develops heat which is confined in the chamber 10 and is thus caused to heat the liquid in the tray 18 since the tray bottom 24 is exposed to the chamber 10. It will be noticed in Figure 1 that the lamp 25 is not directly under the tray but slightly to one side thereof and under the wall section 15. A deflector 31 is therefore provided to prevent accumulation of warm air under the wall section 15 and direct it towards the tray.

The mounting of the tissue sections on the microscope slide is accomplished on the upper face of the tray bottom 24 and this operation is facilitated by directing the light of the source means 25 from beneath the tray through the bottom 24 through the slide and specimen to illuminate them. The tray may be composed of any suitable translucent material or of glass with a frosted surface on the tray bottom.

The slide and tissue sections are relatively small as compared with the area of the tray bottom 24 on which they are assembled. This comparatively large area is desirable from the standpoint of efficiently heating the liquid in the tray 18. This same area is not necessary and may be somewhat objectionable from the standpoint of lighting since it may permit an undesirable glare in the eyes of the observer. Accordingly, provision is made to let the light pass through a limited, comparatively small area which is approximately the size and shape of the microscope slide. To this end there is provided beneath the tray bottom a mask or heat-conducting light-shielding means 32 having an open area or window 33 through which, and also a portion of the tray bottom, the light passes from the chamber 10, and over which area the slide and tissue section are manipulated. The mask may be formed of a separate piece of material which may be attached directly to the outer face of the tray bottom or it may be painted on said outer face, as indicated in the drawing, to render the entire bottom 24 opaque, thus preventing the passage of light through said bottom except the area 33.

The case 9 may be composed of any suitable material such as wood, plastic, metal etc. and its floor or bottom member 16 may be lined with heat insulating material 34 such as asbestos to prevent heating of an object upon which the device may be set.

To effect efficient lighting the inner sides of the walls 11, 12, 13 and 14 and the floor 34 may be provided with suitable light reflecting material 35 such as white paint, or any other suitable material as for example polished metal.

As previously stated the walls 20, 21, 22 and 23 of the tray 18 extend upwardly and outwardly from the bottom 24. This arrangement lends itself readily to setting the tray into the opening 17 of the case 9, the tray being arrested in said opening by engagement of its sloping walls with the top edges of the case walls 11, 12, 13 and 15. In case the tray does not fit tightly against all of the walls small openings may be formed through which the light would ordinarily pass. This would be undesirable and consequently a shield 36 is provided which is attached to the case walls and is located beneath the tray 18. This shield extends inward sufficiently to prevent the light from passing through between the case walls and the tray.

The corners of the tray 18 are rounded as in Fig. 3 and form vents 37 with the inside corners of the case 9 to permit free flow of the air from or into the chamber 10, in accordance with slight variations of temperature in said chamber.

In another form of the invention illustrated in Figure 5, provision is made for automatically controlling the heat so as to maintain the liquid in the tray at substantially the same temperature. In this form of the invention parts which are like those of the device shown in Fig. 2 bear the same reference characters and similar parts bear the same reference characters with the subscript $a$ added. To carry out the features of this form of the invention the light and heat source means includes a fluorescent lamp 25$a$ which furnishes the light and is relatively cool or in other words does not develop much heat. It is located in the chamber 10 and consists of a tube 40 supported in a bracket 41 secured to one of the walls of the case 9$a$. Electric current is supplied to the tube 40 from a source of power through conductors 42 and 43 which may be connected by a switch 44 to conductors 45 and 46 connected to terminals at opposite ends of the tube 40.

To furnish the heat to warm the solution in the tray 18 there is provided within the chamber 10$a$ a heater 47 connected in parallel with the conductors 45 and 46 by conductors 48 and 49 respectively. Thus it will be understood that upon closing the switch 44 power is supplied to both the lamp 25$a$ and the heater 47.

To maintain the temperature of the solution at substantially the same degree, provision is made to control the heater by the temperature within the chamber 10. To this end there is located within the chamber 10 a heat responsive device 50 which may be in the form of a thermostat. It is suitably supported on one of the walls of the case 9$a$. When the temperature of the atmosphere in the chamber 10$a$ reaches a predetermined degree the switch within the thermostat closes and a current is passed from battery 51 through electromagnet 52, conductor 53, switch in thermostat 50, and conductor 54 to ground. Thus the electromagnet 52 is energized and pulls up the armature or switch 55 against the action of a spring to break the connection in the conductor 49 and thus shut off the power supplied to the heater. As soon as the temperature in the chamber 10$a$ drops below the predetermined degree, the switch in the thermostat opens to thus effect the deenergization of the electromagnet 52. As a result the armature 55 drops back, due to the action of its spring, to its closed position and power is again supplied to the heater. This operation of automatically switching the heater off and on may be repeated many times during the course of a day to thus maintain the solution at substantially the same temperature. The temperature at which the solution is to be maintained may be varied as desired by setting the thermostat in the usual manner.

When the technician is called upon temporarily to perform other duties, it is not necessary to leave the electric power connected with lamp 25$a$. A switch 55$x$ is therefore connected in the lamp circuit which may be opened to put out the lamp. In the meantime the solution is kept at the proper temperature by the heater until the technician returns. He then closes the switch 55x to light the lamp 25a and the device is then ready for further use. A similar switch 55y is provided in the heater circuit to disconnect the heater from the supply of current independently of the lamp in case it should be at any time desired to use the lamp alone.

If desired the vertical walls of the case 9a may also be lined with sheets 56 of heat insulating material. In this event the inside faces of the sheets 56 may be coated with light reflecting material 35a.

It should be understood that the device of this invention not only eliminates changing of the solution after each interruption, but experience has shown that the number of specimens mounted during the course of a day by its employment has been greatly increased.

While certain preferred embodiments of the invention have been described, it will be understood that certain parts may be used with others and that changes in the form, arrangements, proportions, size and details thereof may be made without departing from the scope of the invention as defined in the appended claim.

What is claimed is:

In a device to facilitate mounting of a specimen on a microscope slide, the combination of a casing having an open top, light and heat source means in said casing, a specimen-containing tray having a bottom with a light transmitting portion, said tray engaging the edges of the opening to assist in confining the heat of the source means in the casing to effect the transmission of heat through the bottom of the tray to warm a suitable liquid in said tray so that the specimen may be conditioned by the warm liquid for mounting, and heat-conducting, light-shielding means on said tray bottom, the shielding means having a window in alignment with the light transmitting portion, said window having a small area relative to the area of the tray bottom, whereby the light may pass from the source means through the window and tray bottom and a specimen may be manipulated over said window while mounting it on the slide.

ARTHUR H. LONGSTREET.

REFERENCES CITED

The following references are of record in the file of this patent:

UNITED STATES PATENTS

| Number | Name | Date |
| --- | --- | --- |
| 1,936,712 | Foster | Nov. 28, 1933 |
| 1,144,942 | Lidberg | June 29, 1915 |
| 1,839,573 | Merrick | Jan. 5, 1932 |
| 2,234,578 | Riepert | Mar. 11, 1941 |
| 1,015,730 | Gill | Jan. 23, 1912 |
| 1,829,472 | Buck | Oct. 27, 1931 |
| 2,332,668 | Richards | Oct. 26, 1943 |